Dec. 31, 1957   F. J. PILIA ET AL   2,818,493
CIRCLE WELDING MACHINE
Original Filed Aug. 24, 1954   3 Sheets-Sheet 1
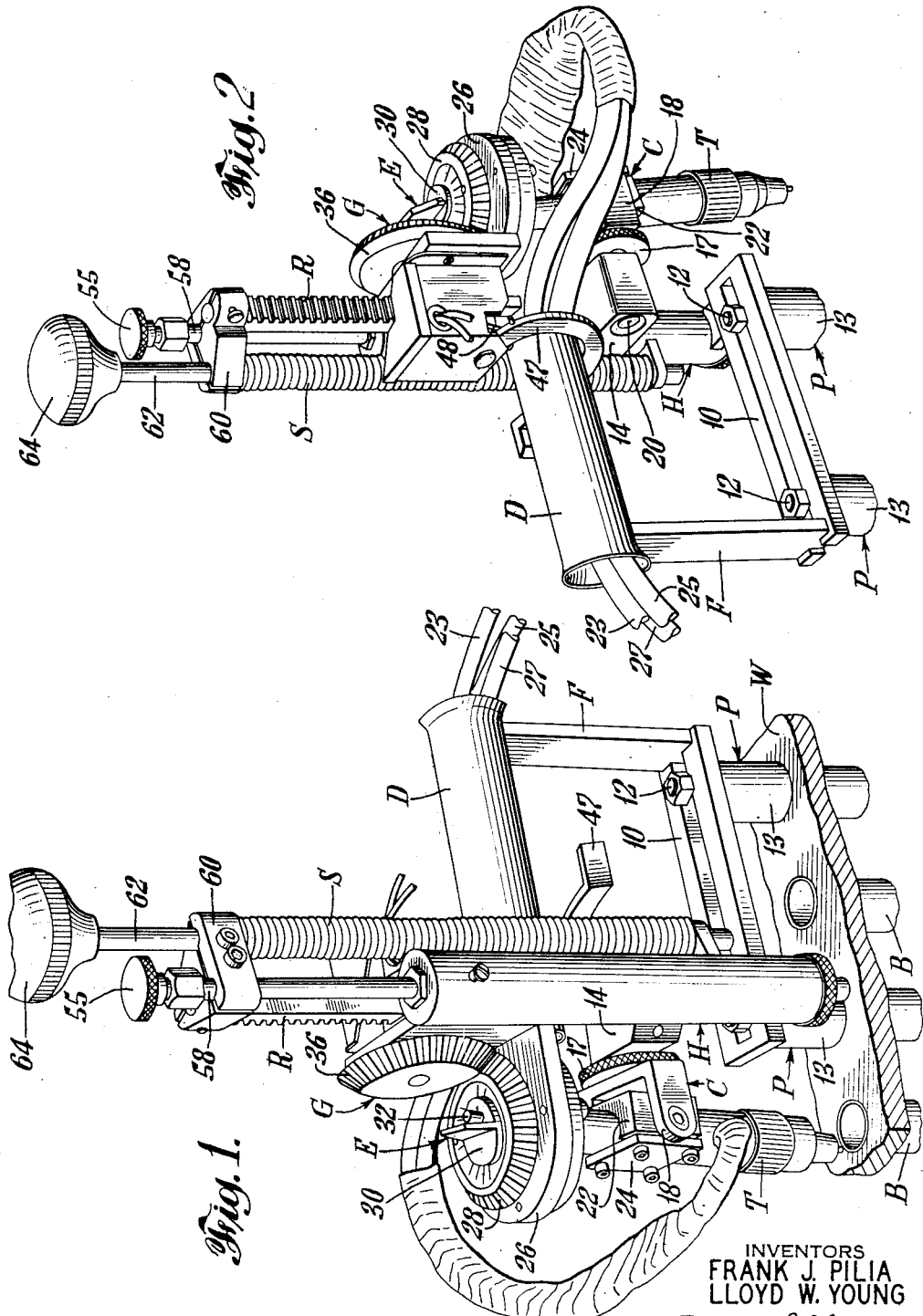
INVENTORS
FRANK J. PILIA
LLOYD W. YOUNG
BY Richard S. Shreve, Jr.
ATTORNEY

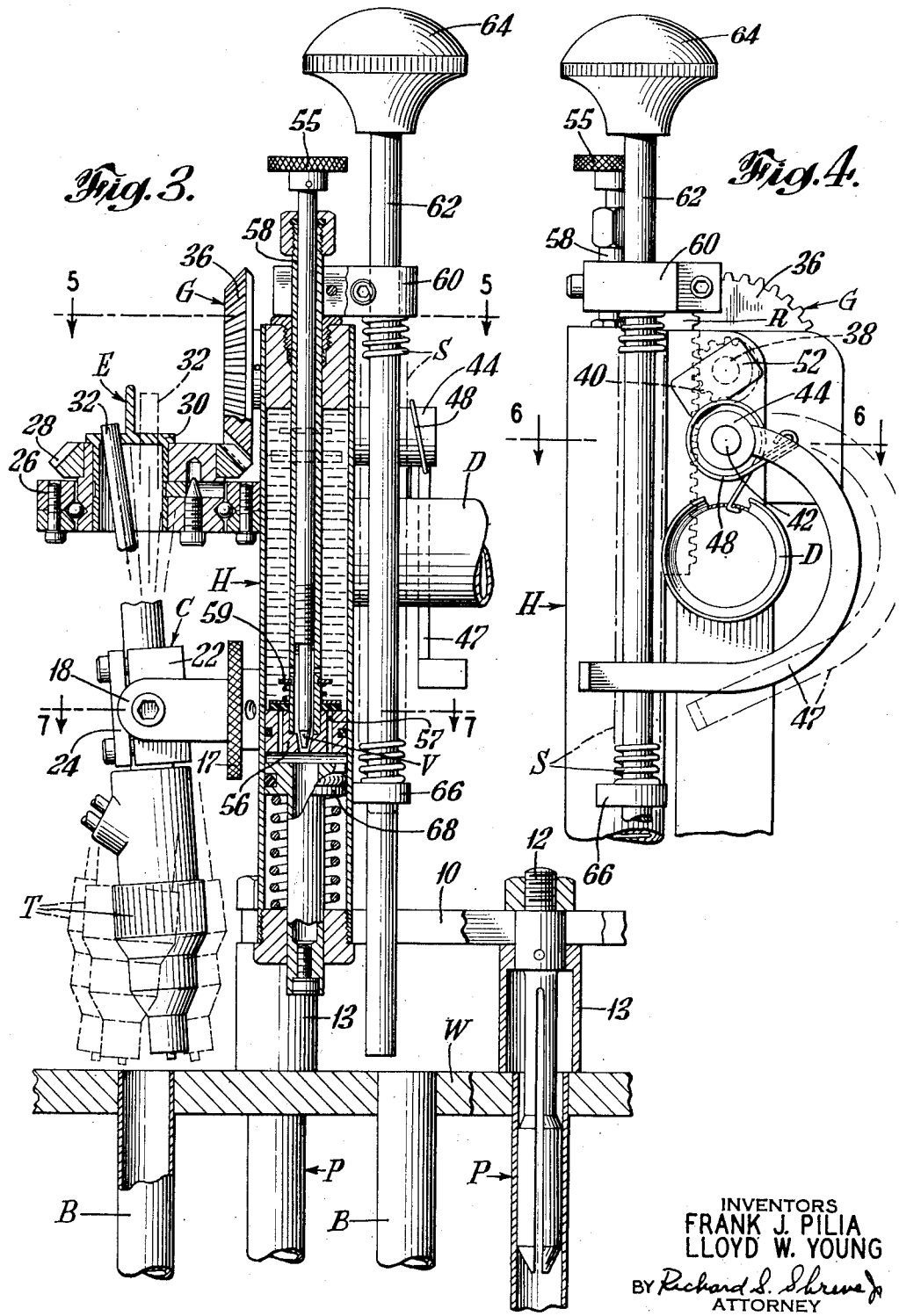

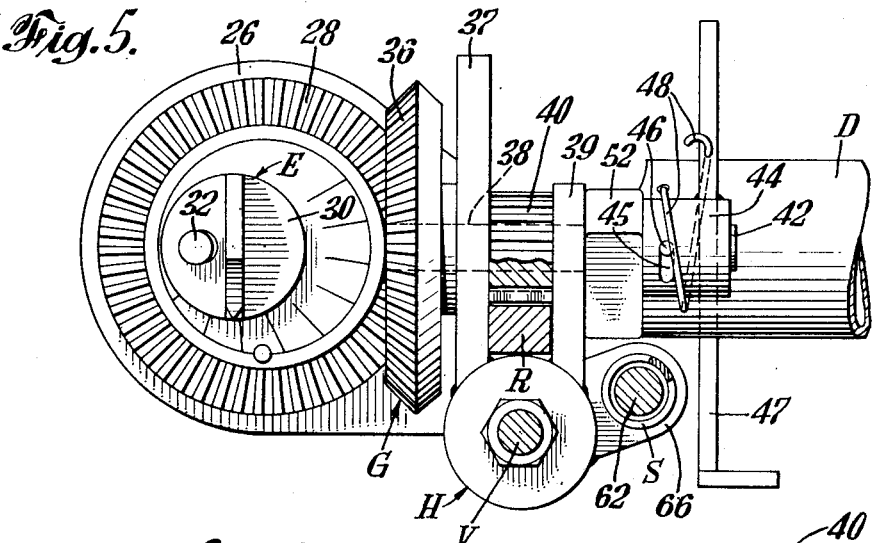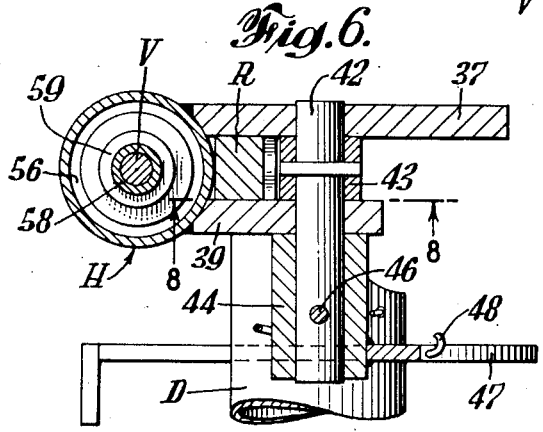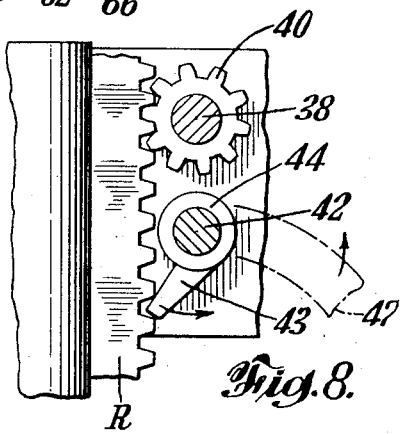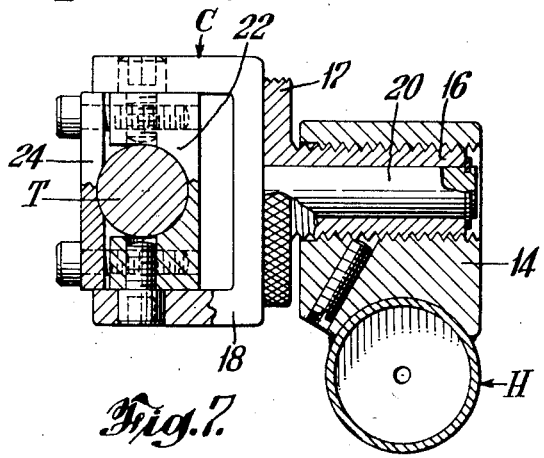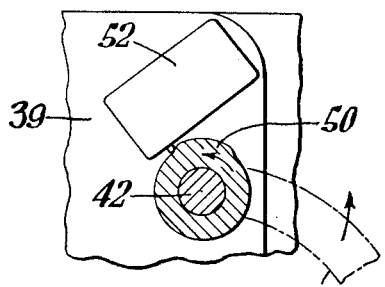

United States Patent Office 2,818,493
Patented Dec. 31, 1957

2,818,493
CIRCLE WELDING MACHINE

Frank J. Pilia, West Orange, and Lloyd W. Young, Elizabeth, N. J., assignors to Union Carbide Corporation, a corporation of New York Continuation of application Serial No. 451,846, August 24, 1954. This application August 7, 1956, Serial No. 602,953

10 Claims. (Cl. 219—125)

This application is a straight continuation of our co-pending application Serial No. 451,846, filed August 24, 1954, now abandoned.

This invention relates to circle welding machines, and more particularly to machines of this character employing an inert gas shielded arc welding torch, preferably having a non-consumable electrode.

In circle welding operations, for example, the welding of tubes to tube sheets or headers in heat exchanger construction, the welding has been done by hand, and the quality of welds produced have depended upon operator skill and operator fatigue. Accordingly, it is the main object of the present invention to mechanically produce a circular weld to eliminate the human element and thereby improve the quality of the weld.

Previous attempts to solve this problem resorting to rotating a torch around a tube have required that the hose assemblies supplying the welding power, cooling water and shielding gas be unwound after each weld. Tube sheets or headers are generally of greater thickness than the tubes, and in order to prevent burning the thin tubes, and to apply more heat to the header stock of greater conductivity, it is another object of this invention to dispose the electrode at an angle to the tube center, so as to describe a conical path upon rotation.

In order to weld tubes, which may be located near flanges or corners, it is another object of this invention to provide a circle welding machine free of lateral projections on one side, to permit the machine to operate close to a flange or corner. Inasmuch as many tube sheets or headers are mounted vertically, it is desirable to provide a circle welding machine in which the electrode rotates about a horizontal axis. Another object is to provide a lightweight compact portable circle welding machine which may be easily held and readily manipulated by the operator.

According to the present invention, the welding torch is mounted on a clevis device so as to permit the electrode to describe a complete circle without rotating the torch about its own axis. The torch is made to describe the circle by an adjustable eccentric device driven by bevel gearing. The bevel gearing is driven by a rack and pinion actuated by a spring and controlled by a hydraulic cylinder. The spring is loaded manually by depressing a knob, which transfers the hydraulic fluid from the lower portion of the cylinder to the upper portion thereof, and compresses the spring. A suitable trigger mechanism is used to hold the spring in the loaded position until the proper time for welding. The spring applies force against the hydraulic fluid in the upper part of the cylinder. The fluid flows to the lower part of the cylinder through a needle valve, adjustment of which controls the range of speed of operation. The piston and its piston rod are connected to the bracket which carries the rack and pinion assembly, and provide the upper bearing surface for the spring.

In the drawings:

Fig. 1 is a perspective view of one side of the machine according to the preferred embodiment of the present invention, in position on a tube sheet or header for welding a tube thereto;

Fig. 2 is a perspective view of the other side of the machine shown in Fig. 1;

Fig. 3 is a vertical section through the machine, showing the hydraulic cylinder and spring drive;

Fig. 4 is an elevation of the rack and pinion mechanism for driving the bevel gearing;

Fig. 5 is a horizontal section taken along the line 5—5 of Fig. 3;

Fig. 6 is a horizontal section taken along the line 6—6 of Fig. 4;

Fig. 7 is a horizontal section taken along the line 7—7 of Fig. 3;

Fig. 8 is a vertical section taken along the line 8—8 of Fig. 6; and

Fig. 9 is an elevation of the other side of Fig. 8.

The machine shown in the drawing comprises a readily portable frame F, on which are mounted the cooperating parts for supporting a torch T and giving it the desired motion in a conical path. The frame F is provided with a handle D by which it can be manipulated, and is also provided with adjustably mounted pegs P which enter adjacent tubes B or holes therefor in the header or workpiece W, to center the machine with respect to the tube to be welded. When the header is vertical, the handle D is manipulated to hold the torch T in a generally horizontal position.

The torch T is mounted in a clevis device C having intersecting pivotal axes, the intersection thereof determining the vertex of the conical path of the torch. The motion of the torch is derived from an adjustable eccentric device E, driven by gearing G and a rack R by a spring or other source of power S, the speed being controlled by a hydraulic cylinder H. An adjustable valve V in the cylinder regulates the speed of rotation of the torch.

The frame F comprises a base 10, which is slotted to receive bolts 12 for adjustably mounting the pegs P. As shown in Fig. 3, the bolts 12 have secured thereto sleeves 13 of larger diameter, for spacing the base 10 from the workpiece W. The frame F also comprises a pad 14, as shown in Fig. 7, secured to the cylinder H and threaded to receive a hollow screw 16 having an enlarged knurled head 17.

The clevis device C comprises a yoke 18 having a sleeve 20 journaled in the bore of the bolt 16, on an axis parallel to the base 10. A block 22 is pivoted in the yoke 18 and is socketed to receive the torch T, which is clamped in the socket by a bolted plate 24. Flexible conduits 23, 25 and 27 passing through the handle D, respectively, supply inert gas, welding current and cooling fluid to the torch T.

The eccentric device E, as shown in Fig. 3, comprises a bevel gear 28 journaled in a shelf 26 of the frame F parallel to the base 10, and having an eccentric bore rotatably adjustably receiving a sleeve 30. The sleeve 30 has an eccentric aperture receiving a drive rod 32 rigid with the torch T.

The gearing G, as shown in Fig. 5, comprises a bevel drive gear 36 meshing with the driven gear 28 and having a shaft 38 journaled in a plate 37 joined to the shelf 26 and to the cylinder H, and a parallel plate 39 secured to the cylinder H. Between the plates 37 and 39 the shaft 38 has keyed thereon a pinion 40 meshing with the rack R.

Journaled in the plates 37 and 39 below the shaft 38 is a shaft 42 on which is keyed a pawl 43 cooperating with the rack R. A sleeve 44 is journaled on the shaft 42 outside of the plate 39 and has a slot 45 receiving a pin 46 on the shaft forming a lost motion connection. The sleeve 44 has secured thereto a trip handle 47 biased into latching position by a spring 48. Mounted on the sleeve 44 is a cam 50 which operates a microswitch 52 interposed in the conduit 25 for the welding current.

The hydraulic cylinder H, as shown in Fig. 3, is provided with a piston 56 in which the needle valve V is mounted for adjustment by a knob 55 and which is provided with by-pass ports 57 closed by a check valve 59. The piston 56 has a tubular piston rod 58 extending out of the top of the cylinder H, and secured to the top of the rack R and to the core rod 62 of the knob 64 by a bracket 60. The bracket 60 forms the upper bearing for the drive spring S through which the core rod 62 extends on through a slide bearing 66 secured to the wall of the cylinder H. The bottom of the cylinder H is provided with a spring pressed piston 68, to compensate for the volume of oil displaced by the piston rod 58.

In setting up the machine for welding, the bolts 12 are adjusted to locate the pegs P according to the spacing of the tubes B. Inasmuch as the tubes B are generally closely spaced, the distance between the pegs P is preferably adjusted to a multiple of the tube spacing. The torch T is adjusted in the block 22 to space the electrode from the workpiece W, and the yoke 18 is adjusted by the knurled head 17 to center the axis of rotation with the tube to be welded. The sleeve 30 is rotatably adjusted to the proper radius of rotation corresponding to the tube diameter, a turn of 180° providing a range from zero to maximum size. The knob 64 is depressed to compress the spring S and to lower the piston 56, the fluid therebelow passing thereabove through the ports 57 as permitted by the check valve 59. The spring 48 urges the pawl 43 into engagement with the rack R to cock the machine in spring loaded position.

In operation, the trip handle 47 is depressed to cause the cam 50 to actuate the microswitch 52 to turn on the welding current. The sleeve 44 rotates on shaft 42 until the pin 46 contacts one end of the slot 45 to take up the lost motion. Further movement of the trip handle 47 rotates the shaft 42 and disengages the pawl 43 from the rack R, thus starting the rotation of the torch. The spring S moves the rack R and piston rod 58 upward, to raise the piston 56, forcing the fluid thereabove to pass down through the needle valve V. The knob 55 is turned to adjust this valve to the desired welding speed. The rack R moving upward drives the pinion 40, shaft 38 and gear 36, which meshing with gear 38 drives the rod 32 and thus rotates the torch T in a conical path having a vertex determined by the eccentric device C.

We claim:

1. Circle welding machine having a frame comprising a base and a shelf thereabove projecting beyond said base, a gear journaled in said projecting shelf and having an eccentric bore, means for mounting a welding tool in said machine with its welding end depending below said shelf to one side of said base and with an upper portion extending up into said eccentric bore, gearing mounted on said frame for driving said eccentrically bored gear, and variable speed power means mounted on said frame for driving said gearing for rotating the depending end of said welding tool about the axis of rotation of said eccentrically bored gear and within the downwardly projected confines of said eccentrically bored gear.

2. Circle welding machine comprising a frame, means for mounting a welding tool for circular movement in said frame, an eccentric device for driving said tool, gearing for driving said eccentric device, and a fluid pressure cylinder for controlling the speed of said gearing.

3. Circle welding machine comprising a frame, a clevis device pivoted on said frame, means for mounting a welding tool in said clevis device, an eccentric device for moving said welding tool in a conical path having a vertex determined by said clevis device, and variable speed means for driving said eccentric device.

4. Circle welding machine comprising a frame having pegs adapted to enter tubes or holes therefor in a header, means for mounting a welding tool for circular movement on said frame, an eccentric device for driving said tool, gearing for driving said eccentric device, and means for adjusting said pegs with respect to said frame to center said torch with respect to a tube to be welded in a hole in said header.

5. Circle welding machine comprising a frame, means for mounting a welding tool for circular movement on said frame, an eccentric device for driving said tool, a smaller eccentric within said eccentric device for adjusting the diameter of such circular movement, and variable speed means for driving said eccentric device.

6. Circle welding machine comprising a frame, a hollow screw threaded in said frame, a clevis device comprising a yoke having a stem journaled in said hollow screw, means for mounting a welding tool in said clevis device, an eccentric device for moving said welding tool in a conical path, and variable speed means for driving said eccentric device.

7. Circle welding machine comprising a frame, means for mounting a welding tool for circular movement in said frame, an eccentric device for driving said tool, gearing for driving said eccentric device, a rack for driving said gearing, a fluid pressure cylinder having a piston rod connected to said rack, power means for driving said rack, and a valve in said fluid pressure piston for controlling the speed of said welding tool.

8. Circle welding machine comprising a frame, a clevis device pivoted on said frame, means for mounting a welding torch in said clevis device, an eccentric device for moving said welding torch in a conical path having a vertex determined by said clevis device, variable speed means for driving said eccentric device, a trip handle, means actuated by initial movement of said trip handle for turning on welding current to said torch, and means actuated by further movement of said trip handle for applying power to said variable speed eccentric driving means.

9. Circle welding machine comprising a frame, a clevis device pivoted on said frame, means for mounting a welding tool in said clevis device, an eccentric device for moving said welding tool in a conical path having a vertex determined by said clevis device, a smaller eccentric within said eccentric device for adjusting the diameter of such conical movement, gearing for driving said eccentric device, and a fluid pressure cylinder for controlling the speed of said gearing.

10. Circle welding machine comprising a frame, a clevis device pivoted on said frame, means for mounting a welding torch in said clevis device, an eccentric device for moving said welding torch in a conical path having a vertex determined by said clevis device, variable speed means for driving said eccentric device, a shaft journaled in said frame, a sleeve journaled on said shaft, a lost motion connection between said sleeve and shaft, a cam on said sleeve, a microswitch actuated by said cam, a trip handle for turning said sleeve, and means actuated by said shaft for applying power to said variable speed eccentric driving means.

References Cited in the file of this patent

UNITED STATES PATENTS

| | | |
|---|---|---|
| 467,752 | Howard | Jan. 26, 1892 |
| 1,508,713 | Noble | Sept. 16, 1924 |
| 1,809,653 | Wagner et al. | June 9, 1931 |
| 1,949,251 | Gilbert | Feb. 27, 1934 |
| 2,474,129 | Traumontini | June 21, 1949 |